United States Patent [19]
Breuer et al.

[11] Patent Number: 5,413,767
[45] Date of Patent: May 9, 1995

[54] MECHANICALLY STABILIZED HEATING CATALYST CONFIGURATION

[75] Inventors: Hans-Jürgen Breuer, Overath; Rolf Brück; Helmut Swars, both of Bergisch Gladbach, all of Germany

[73] Assignee: Emitec Gesellschaft fuer Emissionstechnologie mbH, Lohmar, Germany

[21] Appl. No.: 175,251

[22] Filed: Dec. 27, 1993

[30] Foreign Application Priority Data

Nov. 8, 1993 [DE] Germany ............... 9317050 U

[51] Int. Cl.⁶ ............................................. F01N 3/10
[52] U.S. Cl. ............................ 422/174; 422/189; 422/199; 422/222; 422/177; 60/300; 502/439; 502/527
[58] Field of Search ............... 422/174, 199, 180, 177, 422/222; 60/300; 502/439, 527

[56] References Cited

U.S. PATENT DOCUMENTS

| | | | |
|---|---|---|---|
| 4,584,177 | 4/1986 | Fernback et al. | 422/180 |
| 4,598,063 | 7/1986 | Retallick | 422/180 |
| 4,637,568 | 1/1987 | Cornelison | 422/180 |
| 4,988,483 | 1/1991 | Usui et al. | 502/527 |
| 5,149,508 | 9/1992 | Bullock | 422/174 |
| 5,278,125 | 1/1994 | Ida et al. | 502/527 |

FOREIGN PATENT DOCUMENTS

| | | |
|---|---|---|
| 8910471 | 11/1989 | WIPO . |
| 9213635 | 8/1992 | WIPO . |
| 9213636 | 8/1992 | WIPO . |
| 9218245 | 10/1992 | WIPO . |
| 9320339 | 10/1993 | WIPO . |

*Primary Examiner*—Robert J. Warden
*Assistant Examiner*—Hien Tran
*Attorney, Agent, or Firm*—Herbert L. Lerner; Laurence A. Greenberg

[57] ABSTRACT

An apparatus for the catalytic combustion of exhaust gases in an exhaust system, in particular for an exhaust system of an internal combustion engine, and preferably for Otto engines, includes first and second honeycomb bodies through which a fluid can flow in succession. At least one of the honeycomb bodies is heatable, and the honeycomb bodies each have a multiplicity of channels formed therein defining-channel walls. A plurality of support elements each have at least one end, they extending between the first honeycomb body and the second honeycomb body, they join the first and second honeycomb bodies mechanically, they protrude at least partially into the honeycomb bodies in the vicinity of the at least one end, and they are in mechanical contact with the channel walls in the vicinity of the at least one end. The support elements have a cross section and/or a shape in the vicinity of the at least one end causing the support elements thrust into selected and/or arbitrary channels to mechanically contact the channel walls in the vicinity of the at least one end.

28 Claims, 2 Drawing Sheets

Fig.4
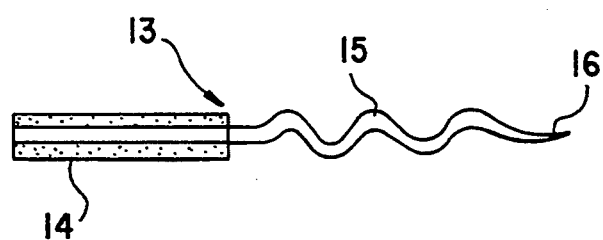
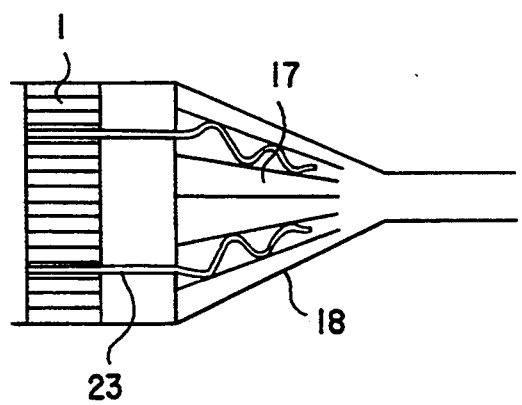
Fig.5

MECHANICALLY STABILIZED HEATING CATALYST CONFIGURATION

BACKGROUND OF THE INVENTION

Field of the Invention

The invention relates to an apparatus for catalytic combustion of exhaust gases in an exhaust system, particularly for an exhaust system of an internal combustion engine, and preferably for Otto engines, having at least a first and a second honeycomb body through which a fluid can flow in succession, the honeycomb bodies each having a multiplicity of channels and at least one of the honeycomb bodies being heatable, and a plurality of support elements each having at least one end, the support elements extending between the first honeycomb body and the second honeycomb body, joining them mechanically, and protruding at least part way into the respective honeycomb body in the region of the at least one end.

Published International Application WO 92/13636, corresponding to U.S. application Ser. No. 08/101,493, filed Aug. 2, 1993, discloses a honeycomb body having a plurality of disks being braced against one another. The honeycomb body has at least two disks which are spaced apart from one another and disposed one after the other in terms of the flow direction of an exhaust gas, and each of them has channels. Near a flow direction, axis, supports are provided by which the disks are joined together and braced against one another. However, the manufacture of such a honeycomb body proves to be difficult, since the location of the supports must be defined accurately beforehand in both parts of the honeycomb body. That is disadvantageous since the exact structure of two honeycomb bodies can only be calibrated with great difficulty, and there will always be at least slight deviations. That is especially true because the honeycomb bodies include wound layers of sheet metal, and during winding the exact location of receptacles for the supports cannot be predicted precisely. In the honeycomb body described above, a few supports must be disposed primarily near the flow axis, but under certain resonance conditions that is not always enough to reliably brace the entire cross-sectional area of the honeycomb body.

Honeycomb bodies, particularly those that are electrically heatable, are also known from Published International Application WO 92/18245; Published International Application WO 89/10471, corresponding to allowed U.S. application Ser. No. 07/604,199, filed Oct. 25, 1990 and U.S. application Ser. No. 08/054,348, filed Apr. 27, 1993; Published International Application WO 93/20339; and Published International Application WO 92/00190, corresponding to U.S. application Ser. No. 08/101,455, filed, Aug. 2, 1993.

SUMMARY OF THE INVENTION

It is accordingly an object of the invention to provide a mechanically stabilized heating catalyst configuration, which overcomes the hereinafore-mentioned disadvantages of the heretofore-known devices of this general type, which includes a combination of two or more honeycomb bodies, which is easy to manufacture, and in which the honeycomb bodies nevertheless are braced against one another to avoid vibration.

With the foregoing and other objects in view there is provided, in accordance with the invention, an apparatus for the catalytic combustion of exhaust gases in an exhaust system, in particular for an exhaust system of an internal combustion engine, and preferably for Otto engines, comprising first and second honeycomb bodies through which a fluid can flow in succession, at least one of the honeycomb bodies being heatable, and the honeycomb bodies each having a multiplicity of channels formed therein defining channel walls; and a plurality of support elements each having at least one end, the support elements extending between the first honeycomb body and the second honeycomb body, the support elements joining the first and second honeycomb bodies mechanically, each support element protruding at least partially into the honeycomb body in the vicinity of the at least one end, and each support element has a cross section and/or a shape in the vicinity of the at least one end causing the support elements inserted or thrust into selected and/or arbitrary channels to mechanically contact the channel walls in the vicinity of the at least one end.

In accordance with another feature of the invention, a support element is firmly joined to the end surface of one honeycomb body, so that a free end of the support element protrudes into the other honeycomb body.

In accordance with a further feature of the invention, suitable cross sections extend from a seat with play to a press-fit seat, and a certain elastic or plastic deformation of a honeycomb channel may also occur when the support elements are fitted into the honeycomb channels.

The particular advantage of this apparatus is that it can be manufactured very easily. The support elements are preferably first secured to one of the honeycomb bodies. This can be done, for example, by brazing them on the end surface to an already existing load-bearing structure or, for instance, by introducing a support element during the process of winding up a honeycomb body from stacks of sheet-metal layers.

The support elements then preferably protrude to the outside at one end surface, approximately parallel to a flow axis of the honeycomb body. A thus-prepared honeycomb body can then be secured to a second honeycomb body, by fitting the pro-truding support elements into individual honeycomb channels of the second honeycomb body, so that one end surface of each of the first and second honeycomb bodies face one another. The honeycomb bodies preferably do not touch one another then. It is advantageous if each honeycomb body is equipped with its own casing tube. The casing tubes are dimensioned in such a way that they can be thrust one inside the other, but they are provided with a stop to prevent the honeycomb bodies located in the casing tubes from touching when fitted together. An advantage of using one casing tube for each individual honeycomb body is that when the honeycomb bodies are joined together, the casing tubes assure secure guidance. In case of mass production it may be more advantageous to use one casing only for all honeycomb bodies.

In accordance with an added feature of the invention, there is provided an insulating mount for the electrically heatable honeycomb body.

The apparatus according to the invention affords great flexibility in the production of exhaust gas catalytic converters having a heated disk. First, an arbitrary number of support elements can be provided, which are suitably distributed over the cross-sectional area of the configuration, to avoid vibration during all accelerations and at all frequencies that may be expected. The support elements may be distributed either statistically or systematically over the cross section. In principle, it is possible to insert the support elements into arbitrary existing channels of a first honeycomb body. If necessary, it is also possible and especially advantageous to insert the support elements into selected channels, in particular those with a somewhat larger cross section. In honeycomb bodies that are produced from corrugated layers of sheet metal, such channels can be attained by providing that the corrugating rollers used for the production have one or more relatively large teeth. The diameter of the support elements can therefore be chosen within certain limits, regardless of the mean diameter of the channels of the honeycomb body. Moreover, the supports, especially if they are pointed at one or both ends, can also be driven into a honeycomb body, causing their plastic deformation. This provides greater freedom in terms of the shapes and cross-sectional areas of the support elements.

An especially advantageous effect is that first one of the two honeycomb bodies can be equipped with support elements, and this thus-equipped honeycomb body can then be put together with the second honeycomb body, optionally with the exertion of force and with deformation occurring, by thrusting the free ends of the support elements into the second honeycomb body.

Although it is possible in principle for some of the pins to be inserted first into the one honeycomb body, and for another group of pins to be inserted into the other honeycomb body, and then for the various free ends of the support elements to be thrust into the respectively other honeycomb body upon assembly, from a production standpoint this is not necessarily suitable.

It is most advantageous if the support elements are first inserted into the shorter honeycomb body, while extending over the entire axial length of this honeycomb body. The free ends of the support elements then protrude from one end surface, while when the two honeycomb bodies are put together, the other ends are hindered from displacement within the first honeycomb body from behind by a simple plate or the like, while the free ends of the pins are being thrust into the second honeycomb body.

In accordance with an additional feature of the invention, the at least the free ends of the support elements taper, and in particular are pointed in the form of a nail. In this way, the free ends of the support elements will always meet a channel of the second honeycomb body, and are possibly pressed very slightly to the side. The first honeycomb body, when completely equipped with support elements, can therefore always be braced by the support elements on an arbitrary honeycomb body disposed behind it. This procedure is virtually equivalent to permanent nailing of a plurality of nails.

In accordance with yet another feature of the invention, in a very particularly preferred way, the apparatus of the invention is employed with metal honeycomb bodies. Once again, the support elements are at least partly formed of metal, and in particular have metal outer surfaces. If these surfaces and/or the channels in which the support elements are disposed are provided with brazing material, then the entire apparatus can be subjected to a brazing process after being assembled. In the case of metal honeycomb bodies that are made up of sheet-metal layers, such a brazing process is necessary anyway. A very stable overall configuration is produced in this way.

In principle, however, it is also possible to first braze the honeycomb bodies individually, and optionally with support elements already inserted on one end, and to put them together later in the manner described above. The support elements can provide stabilization, even if they are not brazed or are brazed on only one end.

Since the support elements need not have the same crosssectional areas on both ends, the present invention is especially suitable for the mutual bracing of two honeycomb bodies with different mean channel cross sections. The first honeycomb body, for instance, may have a low number of cells per unit of cross sectional area or vice versa, which is advantageous for electrically heatable honeycomb bodies, while the second honeycomb body may have a larger number of channels per unit of cross-sectional area. Combinations in which the first honeycomb body has from 50 to 200 cpsi (cells per square inch), for instance, and the second honeycomb body has from 200 to 400 cpsi, for instance, are preferable.

In accordance with yet a further feature of the invention, in order to have even greater flexibility in selecting the honeycomb bodies and support elements, the free ends of the support elements have a coiled form, preferably in serpentine or helical fashion. As a result, the mass of the support elements can be selected independently of the mean channel cross sections of the honeycomb bodies bracing one another, which may be advantageous in view of the given major dynamic strains in a motor vehicle exhaust system. Serpentine or helical support elements can be driven especially well into channels of a honeycomb body and produce a mutually adapted shape of the channel and the support element, which provides a good hold and as applicable promotes a secure connection achieved by joining techniques, such as brazing or hard soldering.

Since it is a criterion, among others, in electrically heatable honeycomb bodies that these honeycomb bodies not have any unnecessarily great mass (because that mass must also be heated), it is appropriate to dimension the support elements and their number purposefully.

In accordance with yet an added feature of the invention, secure bracing is attained if the number n of support elements meets the following relationship:

$$\frac{m_{HK} \cdot a + m_{St} \cdot a \cdot n}{n \cdot A} \leq \alpha_{zul}$$

wherein $m_{HK}$ is the mass of the heatable honeycomb body (1); $m_{St}$ is the mass of a support element (3); a is a maximum acceleration to be expected in the axial and/or radial direction of the apparatus; A is the load-bearing cross-sectional area; and $\alpha_{zul}$ is the maximum allowable mechanical tension occurring in the operating temperature range.

This dimensioning assures that a heatable honeycomb body braced against a following honeycomb body will withstand the strains occurring at the accelerations to be expected during motor vehicle operation (which can be as high as 60 to 80 times the acceleration of the earth, or g) and the high operating temperatures in an exhaust system of an internal combustion engine (800° to 1100° C.).

In accordance with yet an additional feature of the invention, an electrically heatable honeycomb body has at least one electrically conductive path of a length P, which may be intertwined in a meandering or other fashion. The electrical insulation of this path from adjacent parts is carried out either by means of air gaps or by means of insulating intervening layers. In both cases, parts of the electrical path can vibrate, and support elements should therefore be disposed with a mean spacing 1 along the electrically conductive path.

In accordance with again another feature of the invention, secure bracing is attained if this spacing 1 between two adjacent support elements along the electrically conductive path meets the following relationship:

$$\alpha_{zul} \leq \frac{M_b}{W_b} = \frac{q \cdot l^2}{24 \cdot W_b}$$

wherein $\alpha zul$ is the allowable mechanical tension occurring in the operating temperature range; Mb is the bending moment; Wb is the moment of resistance of the heatable honeycomb body (1), and q is the line load from forces of acceleration; and wherein q=mHK/P, where milk is the mass of the heatable honeycomb body (1), and P is the length of the electrical path through the honeycomb body.

In accordance with again a further feature of the invention, in the case of typical applications in motor vehicles, it has proved to be advantageous if the heated honeycomb body is the first disk of the apparatus and has an axial length of from 5 to 30 mm, and preferably approximately 10 mm. The shorter the axial length of this kind of heatable honeycomb body, the greater its tendency to vibration. On the other hand, as the disk is shortened the mass to be braced becomes less, so that the dimensioning and spacing of support elements should be performed in accordance with the above formulas. The support elements themselves preferably include metal pins, particularly in the manner of sheathed conductors. Such pins can be joined metal to metal, particularly by being brazed, without their being an electrical connection between the inner pin and the outer casing. Nevertheless, they bring about a mechanically very durable support.

The present invention can be employed for mutually bracing the most varied types of honeycomb bodies.

In accordance with again an added feature of the invention, the honeycomb bodies being braced against one another are formed of metal or ceramic, are be made up of individual sheet-metal layers or extruded, and combinations are also possible.

In accordance with a concomitant feature of the invention, at least one of the two honeycomb bodies has a curved end surface or a conical longitudinal section.

Other features which are considered as characteristic for the invention are set forth in the appended claims.

Although the invention is illustrated and described herein as embodied in a mechanically stabilized heating catalyst configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a longitudinal-sectional view of another embodiment of a support element; and FIG. 5 is a longitudinal-sectional view of a configuration having one heatable honeycomb body and one conical honeycomb body.

DESCRIPTION OF THE PREFERRED EMBODIMENTS

Figure 1:
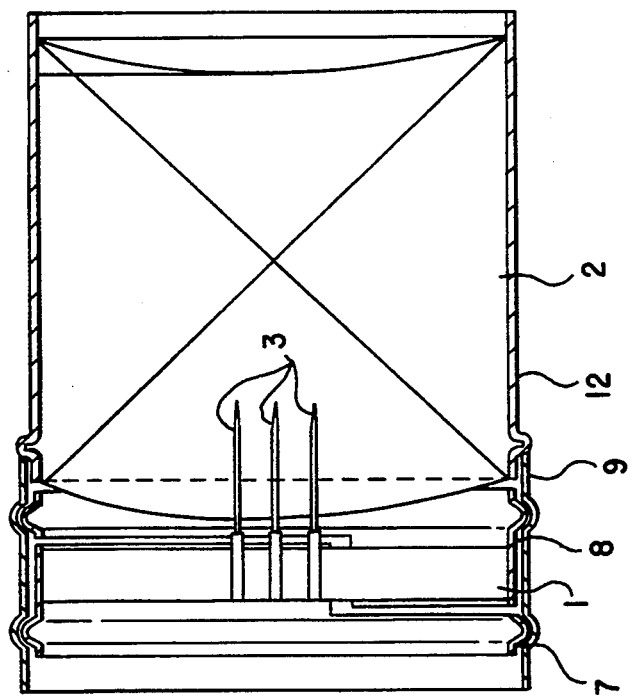
FIG. 1 is a diagrammatic, longitudinal-sectional view of a configuration according to the invention including a first heatable honeycomb body and a second honeycomb body serving as a carrier body.

Referring now to the figures of the drawing in detail and first, particularly, to FIG. 1 thereof, there is seen a preferred exemplary embodiment of the invention in a diagrammatic longitudinal section, which shows only three of many support elements, for the sake of simplicity. An eletrically heatable first honeycomb body 1 is spaced apart from a second honeycomb body 2. The second honeycomb body 2 serves as a carrier. Support elements 3 interconnect the two honeycomb bodies 1 and 2 and brace the first honeycomb body 1, which has a stronger tendency to vibration, against the honeycomb body 2. The first honeycomb body 1 is secured in two half-shells 7, 8 in a manner which is known per se, by way of which electrical current is also delivered. These half-shells 7 and 8 are retained and electrically insulated in a casing 9. The second honeycomb body is also retained in a casing 12, and the two casings 9 and 12 are joined together to make a unit by joining techniques. It is also possible in principle to accommodate the configuration in a one-piece casing. The second honeycomb body 2 in the present exemplary embodiment has a slightly curved end surface oriented or facing toward the first honeycomb body 1, and as a result the bracing of the first honeycomb body 1 in the middle, where the tendency to vibration is the greatest, is reinforced, without infringement in the outer region of the spacing necessary for the electrical insulation of the half-shell 8.

Figure 2:
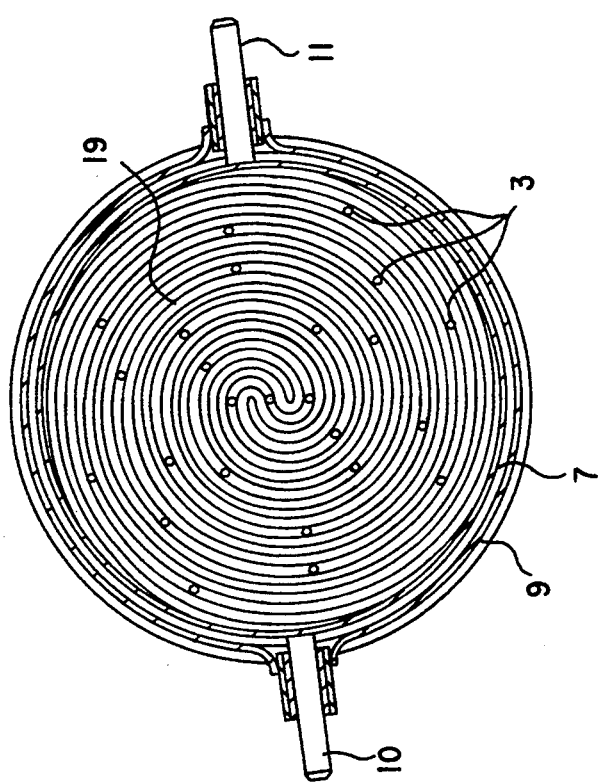
FIG. 2 is a cross-sectional view of the heatable honeycomb body of FIG. 1.

FIG. 2 is a diagrammatic cross section through the first honeycomb body 1. In particular, electrical power lines 10 and 11 are ducted in an electrically insulated fashion through the casing 9. The power lines or electrodes 10 and 11 supply the half-shells 7 and 8 with heating current. In the present exemplary embodiment, the first honeycomb body is a honeycomb body that is produced in a manner which is known per se from a stack of metal sheets that are intertwined in the form of an S. The support elements 3 are inserted into some of the channels of this honeycomb body and may be distributed statistically or symmetrically over the cross-sectional area. In particular, it is advantageous if these support elements are disposed at certain intervals, i.e. spacings, along the intertwined stack of metal sheets, so as to repeatedly stabilize the stack against vibration. Since the honeycomb body 1 has air gaps or insulating intervening layers 19 with which the individual windings of the intertwined stack are electrically insulated from one another, it is appropriate to brace this stack repeatedly. However, the tendency to vibration is greater in the center than farther out, and therefore the spacings between the support elements 3 can optionally increase toward the outside. The support elements, exemplary embodiments of which will be described in further detail in conjunction with FIGS. 3 and 4, may be constructed in such a way that they can be inserted by one end into arbitrary channels of the first honeycomb body, and when the honeycomb bodies are put together can then be thrust into arbitrary channels of the second honeycomb body. This is the most advantageous version from the standpoint of joining techniques, but in principle it is also possible for individual channels of the first honeycomb body to be constructed specially (such as by being larger, for instance), in order to enable purposefully inserting support elements or building them in jointly as such a body is wound.

It has proved to be advantageous under certain conditions for the performance of an electrically heatable honeycomb body in cold starting, if the honeycomb body has a relatively low number of channels per unit of cross-sectional area, while a following honeycomb body should have a larger number of channels per unit of cross-sectional area. For this reason it is appropriate for the support elements in the region in which they rest in the first honeycomb body to be thicker than in the region is that can be thrust into the second honeycomb body. This also readily affords the possibility of constructing the support elements in such a way as to be electrically insulating, as will be described in detail in conjunction with FIGS. 3 and 4 below, in order to avoid electric circuits through the second honeycomb body in the event that that honeycomb body is also electrically conductive.

Figure 3:
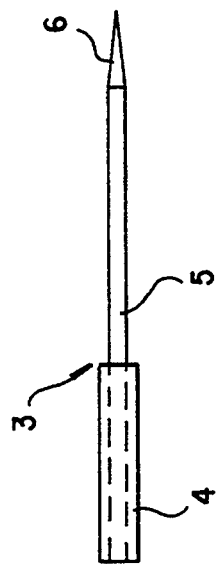
FIG. 3 is a longitudinal-sectional view of a support element.

FIG. 3 shows a longitudinal section through a support element 3 having a support element sheath 4 and a support pin 5. The support element sheath 4 and the support pin 5 can be joined together and simultaneously electrically insulated from one another by means of a ceramic insulating layer, as is known, for instance, for electrical sheathed conductors. The electrical insulation may be omitted if there is no need to fear an electrical short circuit because of the configuration of the pins or the electrical properties of the second honeycomb body. If the channel cross sections in the two honeycomb bodies to be joined together are approximately the same, then naturally a second support element sheath may be provided on the other end of the support pin 5, if an electrical insulation is desired. If not, a pin having the same diameter throughout may be used. In order to put together two honeycomb bodies to make the apparatus according to the invention, it is especially advantageous if the support elements have a support pin point 6, since when the parts are put together this point will always find a channel located approximately opposite it and can be thrust into a channel of the second honeycomb body, possibly becoming deformed in the process.

FIG. 4 shows a further embodiment of a support element 13, which once again has a support element sheath 14 being electrically insulated from a support pin 15. However, in this exemplary embodiment the support pin 15 is serpentine or helical, and the amplitude of the corrugation or the diameter of the corrugation can be adapted to various channel cross sections of the honeycomb body into which this support pin is intended to be thrust. Once again, it is naturally appropriate for the support pin 15 to have a support pin point 16 or a taper of the serpentine or helical coil.

FIG. 5 shows an example of the many possible combinations permitted by the present invention. In this exemplary embodiment, a first electrically heatable honeycomb body 1 is braced against a conical honeycomb body 18 by support pins 23. Since channels 17 of this conical honeycomb body 18 are also conical, a structure in accordance with FIG. 4 with a serpentine or helical coil, in which the amplitude or diameter decreases toward the point 16, is especially suitable for the support pins 23.

The present invention is especially suitable for bracing relatively short heatable honeycomb bodies against following, more-stable honeycomb bodies, but is not limited to such exemplary embodiments. Due to the great versatility in terms of the selection of braces, no consideration need be taken of the mechanical stability or its natural resonance in constructing the electrically heatable honeycomb body, since vibration can be prevented by means of a suitable selection of the number and locations of support elements.

We claim:

1. An apparatus for the catalytic combustion of exhaust gases in an exhaust system, comprising:

first and second honeycomb bodies through which a fluid can flow in succession, at least one of said honeycomb bodies being heatable and having two electrodes connected thereto between which an electrically conductive path extending through said at least one honeycomb body, and said honeycomb bodies each having a multiplicity of channels formed therein defining channel walls; and a plurality of support elements end, said support elements extending between said first honeycomb body and said second honeycomb body, said support elements joining said first and second honeycomb bodies, said support element protruding at least partially into each of said honeycomb bodies, each support element being in contact with said channel walls of said honeycomb bodies, and each support element being disposed along said electrically conductive path.

2. The apparatus according to claim 1, wherein said support elements are joined said first and second honeycomb bodies at symmetrically selected channels thereof.

3. The apparatus according to claim 1, wherein said support elements are joined to said first and second honeycomb bodies at statistically selected channels thereof.

4. The apparatus according to claim 1, wherein said plurality of support elements have a number n of support elements and meet the following relationship:

$$\frac{m_{HK} \cdot a}{\alpha_{zul} \cdot A - m_{St} \cdot a} \leq n$$

wherein:
mHK is the mass of said at least one heatable honeycomb body;
mSt is the mass of one of said support elements;
a is a maximum acceleration to be expected in at least one axial and radial directions of the apparatus;
A is a load-bearing cross-sectional area; and
$\alpha_{zul}$ is a maximum allowable mechanical tension occurring in an operating temperature range.

5. The apparatus according to claim 1, wherein said at least one heatable honeycomb body is axially shorter than the other of said honeycomb bodies.

6. The apparatus according to claim 5, wherein said at least one heatable honeycomb body has a length of from 5 to 30 mm.

7. The apparatus according to claim 5, wherein said at least one heatable honeycomb body has a length of approximately 10 mm.

8. The apparatus according to claim 1, including means for electrically dividing said at least one heatable honeycomb body over a cross-sectional area thereof.

9. The apparatus according to claim 1, wherein two of said support elements are adjacent to one another and have a mean spacing 1 therebetween along said electrically conductive path meeting the following relationship:

$$a_{zul} \leq \frac{M_b}{W_b} = \frac{q \cdot l^2}{24 \cdot W_b}$$

wherein:
$a_{zul}$ is an allowable mechanical tension occurring in an operating temperature range;
Mb is a bending moment;
Wb is a moment of mechanical resistance of said at least one heatable honeycomb body; and
q is a line load from forces of acceleration; and
wherein:
q=mHK/P, where
mHK is the mass of said at least one heatable honeycomb body; and
P is the length of said electrical path through said honeycomb body.

10. The apparatus according to claim 9, including means for electrically dividing said at least one heatable honeycomb body in a curved course over a cross-sectional area, and said spacing 1 between said two support elements is measured along said curved course.

11. The apparatus according to claim 1, wherein said first honeycomb body and said second honeycomb body are electrically insulated from one another.

12. The apparatus according to claim 1, wherein said support elements are at least partly formed of metal.

13. The apparatus according to claim 1, wherein said support elements taper at least one end thereof.

14. The apparatus according to claim 1, wherein said support elements taper conically at least one end thereof.

15. The apparatus according to claim 1, wherein said support elements have a coiled shape at least one end thereof.

16. The apparatus according to claim 15, wherein said coiled shape is serpentine.

17. The apparatus according to claim 15, wherein said coiled shape is helical.

18. The apparatus according to claim 1, wherein said channels of said first honeycomb body and said second honeycomb body have different mean cross-sectional areas.

19. The apparatus according to claim 1, wherein said first honeycomb body is formed of metal, and said second honeycomb body is formed of a ceramic.

20. The apparatus according to claim 1, wherein at least one of said honeycomb bodies is an extruded honeycomb body.

21. The apparatus according to claim 20, wherein said at least one extruded honeycomb body contains metal material.

22. The apparatus according to claim 1, wherein said channels in at least one of said honeycomb bodies extend substantially parallel to a primary flow direction.

23. The apparatus according to claim 1, wherein said channels in at least one of said honeycomb bodies extend obliquely to a primary flow direction.

24. The apparatus according to claim 1, wherein at least one of said honeycomb bodies has curved end surfaces.

25. The apparatus according to claim 24, wherein said at least one honeycomb body with curved end surfaces is a non-heatable honeycomb body.

26. The apparatus according to claim 1, wherein one of said honeycomb bodies is conical as seen in a longitudinal section.

27. The apparatus according to claim 26, wherein said conical honeycomb body is a non-heatable honeycomb body.

28. The apparatus according to claim 9, wherein said first honeycomb body and said second honeycomb body are formed of metal, and said support elements are electrically insulatingly secured at said at least one end thereof.

* * * * *

UNITED STATES PATENT AND TRADEMARK OFFICE
CERTIFICATE OF CORRECTION

PATENT NO. : 5,413,767
DATED : May 9, 1995
INVENTOR(S) : Hans-Juergen Breuer, Rolf Brueck, Helmut Swars It is certified that error appears in the above—identified patent and that said Letters Patent is hereby corrected as shown below:

Column 8:

In the claims, claim 1, line 11, after "elements" delete "end";

claim 2, line 2, after "joined" insert -- to --.

Signed and Sealed this

Thirtieth Day of January, 1996

*Attest:*

BRUCE LEHMAN

*Attesting Officer*   *Commissioner of Patents and Trademarks*